(12) United States Patent
Li et al.

(10) Patent No.: US 9,694,442 B2
(45) Date of Patent: Jul. 4, 2017

(54) APPARATUS AND METHOD FOR FORMING ELECTRICAL SOLDER CONNECTIONS IN A DISK DRIVE UNIT

(75) Inventors: Ning Li, DongGuan (CN); Qin Ping Zhao, DongGuan (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 583 days.

(21) Appl. No.: 13/470,432

(22) Filed: May 14, 2012

(65) Prior Publication Data
US 2013/0256277 A1 Oct. 3, 2013

(30) Foreign Application Priority Data

Mar. 28, 2012 (CN) .......................... 2012 1 0087108

(51) Int. Cl.
| | |
|---|---|
| *B23K 26/00* | (2014.01) |
| *B23K 1/00* | (2006.01) |
| *B23K 26/14* | (2014.01) |
| *B23K 1/005* | (2006.01) |
| *B23K 3/06* | (2006.01) |
| *B23K 26/60* | (2014.01) |
| *B23K 101/42* | (2006.01) |

(52) U.S. Cl.
CPC ............ *B23K 26/14* (2013.01); *B23K 1/0016* (2013.01); *B23K 1/0056* (2013.01); *B23K 3/0623* (2013.01); *B23K 26/1476* (2013.01); *B23K 26/60* (2015.10); *B23K 2201/42* (2013.01)

(58) Field of Classification Search
CPC ...... B23K 26/00; B23K 26/0054; B23K 1/00; B23K 1/005
USPC .......................... 219/121.68, 121.76, 121.84, 219/121.63–121.69, 121.85; 228/41, 33, 228/51, 52, 1.1, 111
See application file for complete search history.

(56) References Cited

U.S. PATENT DOCUMENTS

| | | | |
|---|---|---|---|
| 5,506,385 A * | 4/1996 | Murakami et al. | 219/121.63 |
| 8,013,271 B2 * | 9/2011 | Fukaya et al. | 219/121.65 |
| 2004/0094600 A1 * | 5/2004 | Zakel et al. | 228/41 |
| 2006/0219760 A1 * | 10/2006 | Wagoh et al. | 228/248.1 |
| 2008/0073413 A1 * | 3/2008 | Mizuno et al. | 228/180.22 |
| 2008/0179299 A1 * | 7/2008 | Fukaya et al. | 219/121.63 |
| 2010/0089981 A1 * | 4/2010 | Matsumoto et al. | 228/245 |

* cited by examiner

*Primary Examiner* — Michael Laflame, Jr.
(74) *Attorney, Agent, or Firm* — Nixon & Vanderhye PC

(57) ABSTRACT

An apparatus for forming electrical solder connections in a disk drive unit includes: a nozzle device for carrying out soldering on two pre-welding surfaces; a solder ball feeding device for transferring a single solder ball to the nozzle device; a gas pump device for supplying pressurized gases to the nozzle device; a laser device for emitting laser beams to the solder ball; and a control device including at least one sensor for at least detecting status of the solder ball or pressure in the nozzle device or distance between the nozzle device and the pre-welding surfaces, and a control unit connected with the at least one sensor. The present invention can easily control the solder ball, the pressurized gases and the laser beams, thereby keeping the pressure of the nozzle device and the laser energy stable and, in turn improving the soldering result.

6 Claims, 6 Drawing Sheets

APPARATUS AND METHOD FOR FORMING ELECTRICAL SOLDER CONNECTIONS IN A DISK DRIVE UNIT

This application claims priority to Chinese Application No. 201210087108.X filed 28 Mar. 2012, the entire contents of which is hereby incorporated by reference.

FIELD OF THE INVENTION

The present invention relates to a soldering device and a soldering method and, more particularly, to an apparatus and a method for forming electrical solder connections in a disk drive unit.

BACKGROUND OF THE INVENTION

Hard disk drives are information storage devices that use thin film magnetic media to store data. Referring to FIG. 1a, a typical hard disk drive 1 in prior art comprises a head stack assembly (HSA) 10 with slider 11 (shown in FIG. 1b) thereon, a magnetic disk 12 mounted on a spindle motor 13 which causes the magnetic disk 12 to spin, and a motor base 14 to enclose the above-mentioned components.

The slider 11 flies over the surface of the magnetic disk 12 at a high velocity to read data from or write data to concentric data tracks on the magnetic disk 12, which is positioned radially by a voice coil 15 embedded (e.g. by epoxy potting or overmolding) in a fantail spacer 16 of the HSA 10. Generally, a voice coil motor (VCM) 16 is used to drive the voice coil 15.

Referring to FIG. 1b, a traditional HSA 10 includes an actuator coil assembly (ACA) 101, a fantail spacer 16 interposed in the ACA 101 via the voice coil 15, at least an HGA 102 connected with the ACA 101, and a controlling circuit 140 for controlling the HGA 102. The ACA 101 has at least one top surface 131 for mounting the HGA 102, and a side surface 132 for mounting the control circuit 140.

As shown in FIG. 1b, the controlling circuit 140 is a flexible printed circuit assembly (FPCA) that includes a printed circuit board assembly (PCBA) 141 for connecting with a preamplifier (not shown) and a flexible printed circuitry (FPC) 142 connecting with the PCBA 141. And the FPC 142 electrically connects to the HGA 102, and mounts on the side surface 132 of the ACA 101.

The HGA 102 includes a suspension 190 and a slider 11 supported by the suspension 190, and the suspension 190 includes a flexure 126 having a head 126a and a tail 126b, and the flexure 126 runs from the slider 11 to the tail 126b. The tail 126 is bent for connecting with the FPC 142. The tail 126 has several bonding pads 128 formed thereon. Concretely, the FPC 142 includes several bonding pads 143 formed thereon. The HGA 102 is connected with the FPC 142 by connected the bonding pads 128 with the bonding pads 143 via several solder balls (not shown).

Additionally, the assembly of the disk drive unit 1 further includes solder connections between the slider 11 and the suspension 190, the FPC 142 and the fantail spacer 16, for example.

The following is descriptions of a conventional apparatus for forming solder connection between two pre-welding surfaces in the disk drive unit 1.

As shown in FIG. 2, the conventional soldering apparatus 180 commonly includes a nozzle device 181, a solder ball feeding device 182, a laser generator 183 and a gas feeding device 184. The nozzle device 181 has a main passage 185 which is tapered. A solder ball 186 is supplied from a first passage 187 connected with the solder ball feeding device 182 and the nozzle device 181, and then the nitrogen gases are supplied from a second passage 188 so as to prompt the solder ball 186 to move to the outlet 191, and finally the laser beams are emitted from a third passage 189 so as to melt the solder ball 186 and reflow to the pre-welding surfaces 150.

In this state, the nitrogen gases and the laser beams are hard to control. For example, it's hard to control the timing of supplying laser beams, and it's also hard to control the energy of the laser beams and the quantity of nitrogen gases. Therefore, the laser energy and the pressure in the nozzle device 181 are unstable, which may affect the soldering result. Furthermore, as the solder ball, the nitrogen gases and the laser beams are provided to the nozzle device 181 from three different passages, and the three passages and the main passage 185 are integrative and unitary, thus it's quite inconvenient to clean or change the nozzle device 181, which may spend a lot of time and workload.

Thus, there is a need for an improved apparatus and method for forming electrical solder connections in a disk drive unit to overcome the drawbacks mentioned above.

SUMMARY OF THE INVENTION

One aspect of the present invention is to provide an apparatus for forming electrical solder connections in a disk drive unit, which can easily control the solder ball, the pressurized gases and the laser beams, thereby keeping the pressure and the laser energy of the nozzle device stable and, in turn improving the soldering result.

Another aspect of the present invention is to provide a method for forming electrical solder connections in a disk drive unit, which can easily control the solder ball, the pressurized gases and the laser beams, thereby keeping the pressure of the nozzle device and the laser energy stable and, in turn improving the soldering result.

To achieve above objectives, an apparatus for forming electrical solder connections in a disk drive unit includes: a nozzle device for carrying out soldering on two pre-welding surfaces; a solder ball feeding device for transferring a single solder ball to the nozzle device; a gas pump device for supplying pressurized gases to the nozzle device; a laser device for emitting laser beams to the solder ball, thereby melting and reflowing the solder ball; and a control device including at least one sensor for at least detecting status of the solder ball or pressure in the nozzle device or distance between the nozzle device and the pre-welding surfaces, and a control unit connected with the at least one sensor.

As a preferred embodiment, a common passage is provided for connecting the nozzle device with the solder ball feeding device, the gas pump device and the laser device respectively.

Preferably, the nozzle device includes a nozzle and a holder for holding the nozzle, and the nozzle and the holder are two separate and removable structures and connected by a fixture.

Preferably, the nozzle has a main passage and a solder ball outlet, and the holder has a guiding passage communicated with the main passage and the common passage, and the common passage, guiding passage and main passage are coaxial.

As another preferred embodiment, the control device includes a first sensor connected with the common passage for detecting whether a single solder ball is provided on the common passage.

Preferably, the control device includes a second sensor connected with the guiding passage for detecting whether the pressure in the guiding passage achieves to a predetermined value.

More preferably, the control device includes a third sensor configured on the nozzle or the holder for detecting the distance between the solder ball outlet and the pre-welding surfaces.

Preferably, the laser device includes a laser generator connected with the control device and reflection glass connected with the common passage and the guiding passage via a through hole formed thereon.

As yet a preferred embodiment, the common passage has a rectangular cross section, which has a first diameter larger than the diameter of the solder ball.

Preferably, the guiding passage has a tapered cross section which has a maximum diameter and a minimum diameter, and the minimum diameter is larger than the first diameter.

Preferably, the main passage has a tapered cross section, and the narrowed solder ball outlet has a second diameter which is smaller than the diameter of the solder ball.

Accordingly, a for forming electrical solder connections in a disk drive unit, includes steps of providing a single solder ball to a nozzle device; supplying pressurized gases to the nozzle device; and emitting laser beams to the solder ball while the pressurized gases achieve to a predetermined value and the distance between the nozzle device and pre-welding surfaces achieves to a predetermined distance, thereby melting the solder ball.

Preferably, the solder ball, the pressurized gases and the laser beams are provided to the nozzle device via a common passage.

Preferably, the pressurized gases comprise protective gases and inert gases.

Preferably, it further includes supplying protective gases to the nozzle device during the soldering process thereby preventing the solder ball from being oxidated.

In comparison with the prior art, the present invention provides an apparatus and method for forming electrical solder connections in a disk drive unit, which has a control device including at least one sensor for at least detecting status of the solder ball or pressure in the nozzle device or distance between the nozzle device and the surfaces to be soldered, and a control unit connected with the at least one sensor. Therefore, the solder ball, the pressurized gases and the laser beams are easy to control, thereby keeping the pressure of the nozzle device and the laser energy stable and, in turn improving the soldering result.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b is a perspective exploded view of a HSA of the hard disk drive shown in FIG. 1a;

DETAILED DESCRIPTION OF ILLUSTRATED EMBODIMENTS

Figure 1A:
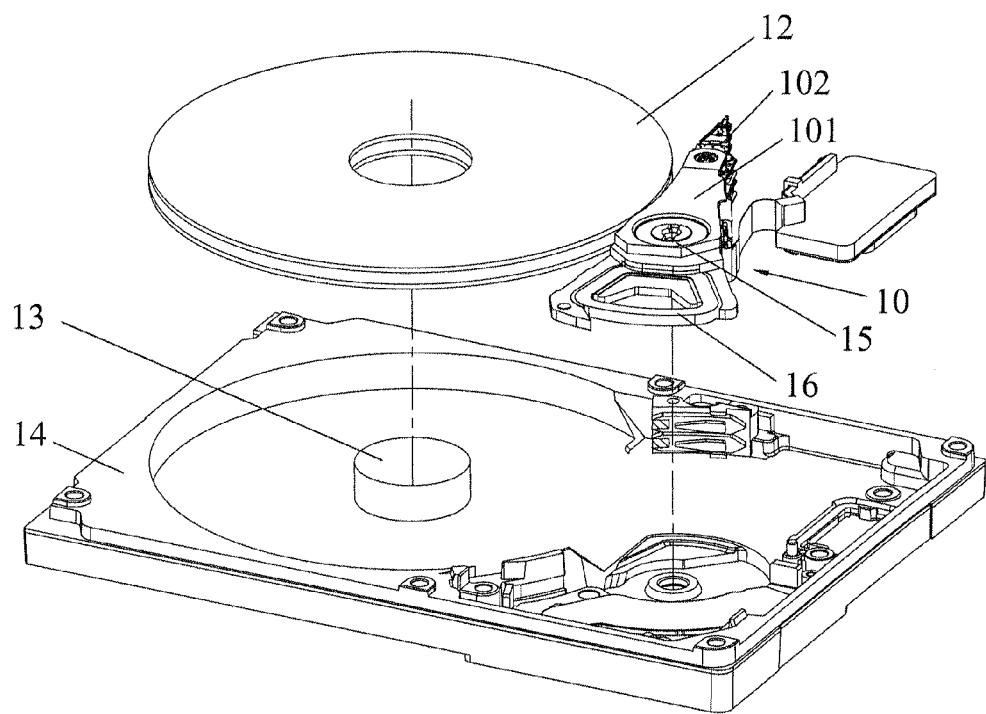
FIG. 1a is a perspective exploded view of a conventional hard disk drive.
Figure 1B:
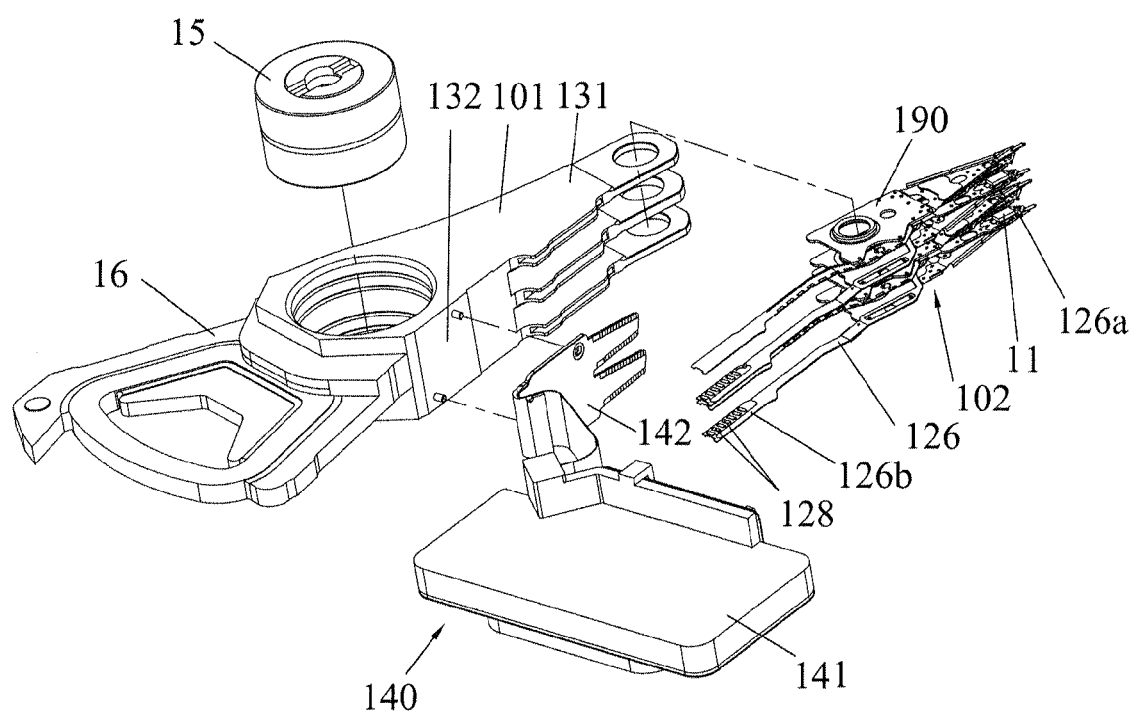
Figure 2:
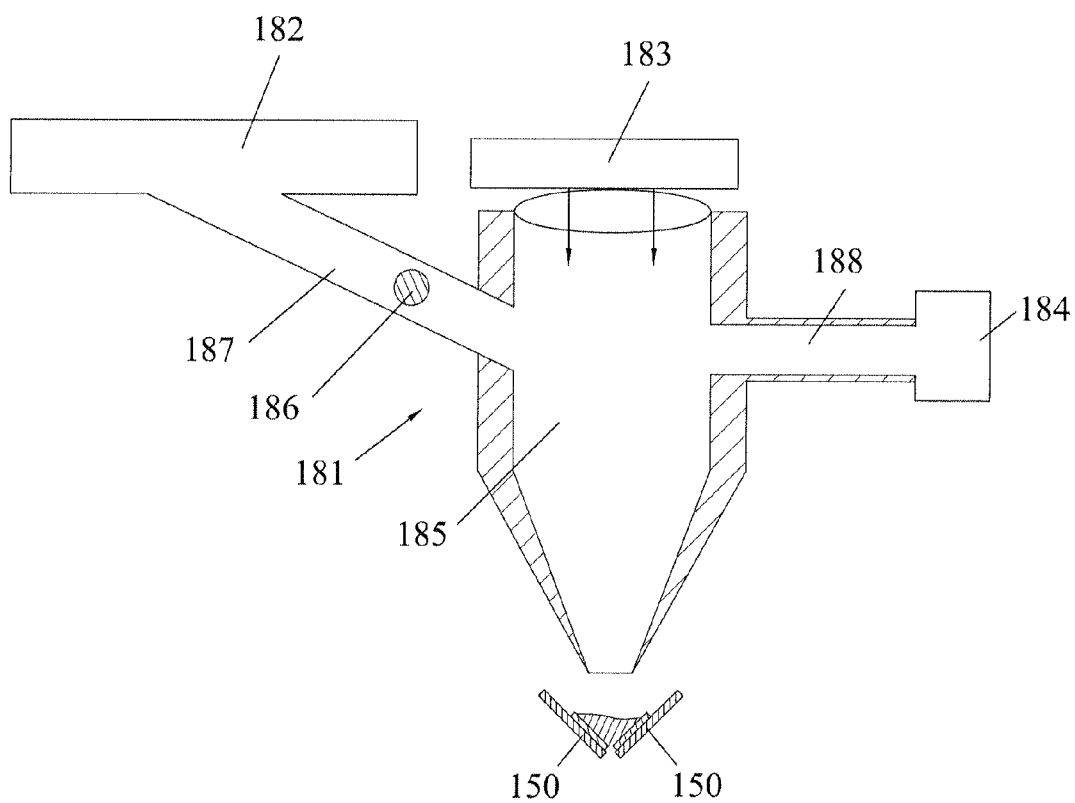
FIG. 2 shows a conventional apparatus for forming solder connection between two pre-welding surfaces in the hard disk drive.

Various preferred embodiments of the invention will now be described with reference to the figures, wherein like reference numerals designate similar parts throughout the various views. As indicated above, the invention is directed to an apparatus and a method for forming electrical solder connections in a disk drive unit, which can ensure a single solder ball supplied to the nozzle device without jam, and provide stable laser beams to benefit to perform a solder connection. Furthermore, the pressure in the nozzle device is easy to control.

Figure 3:
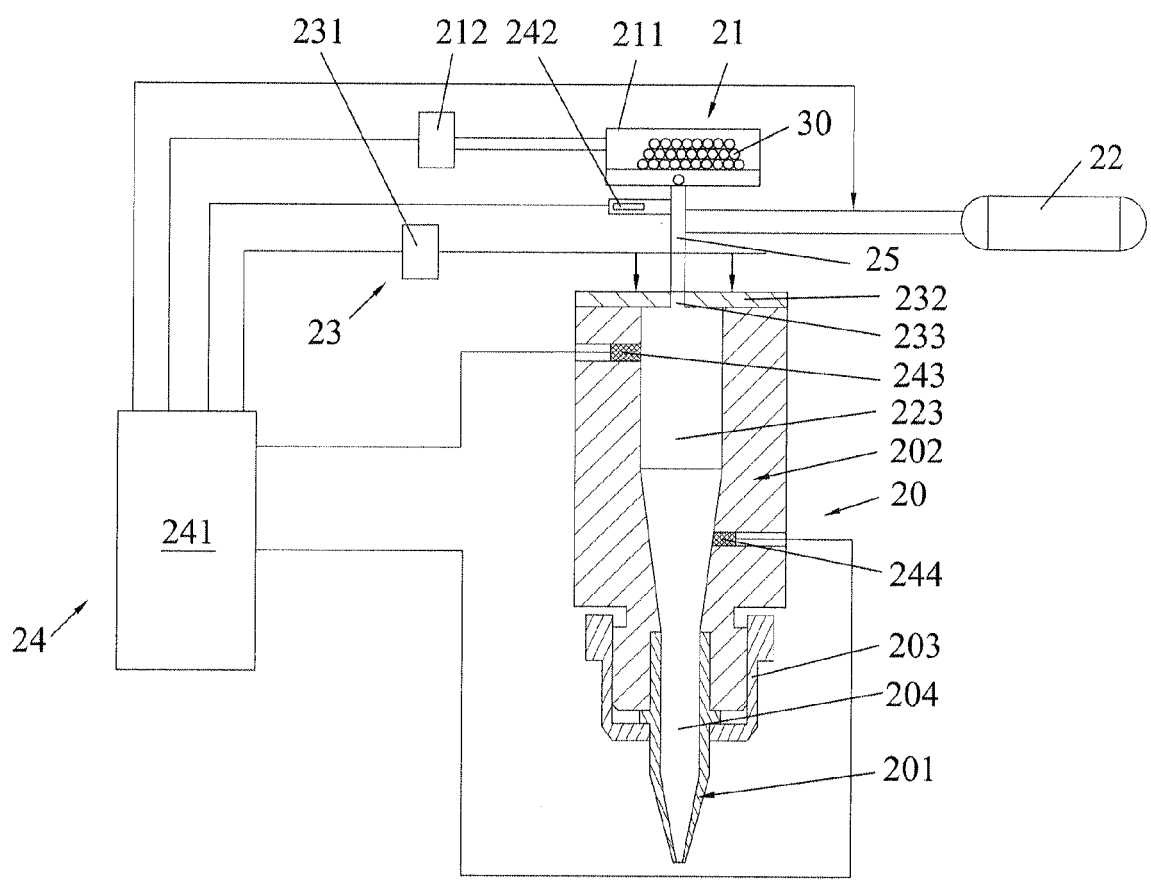
FIG. 3 shows an apparatus for forming solder connection in a disk drive unit according to one embodiment of the present invention.
Figure 4:
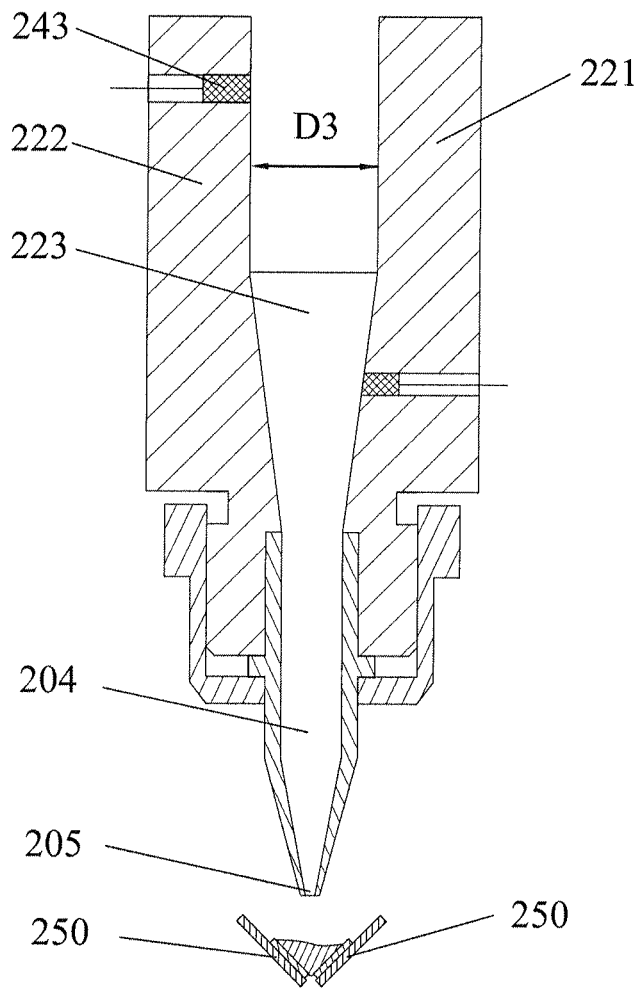
FIG. 4 shows the nozzle device of the apparatus shown in FIG. 3.

Referring to FIGS. 3-4, the apparatus 2 according to one embodiment of the present invention includes a nozzle device 20 for carrying out soldering process, a solder ball feeding device 21 for transferring a single solder ball to the nozzle device 20, a gas pump device 22 for supplying pressurized gases to the nozzle device 20, a laser device 23 for emitting laser beams to the solder ball and a control device 24 for controlling the soldering process.

Specifically, a common passage 25 is provided for connecting the nozzle device 20 with the solder ball feeding device 21, the gas pump device 22 and the laser device 23 respectively. That is, the solder balls 30, laser beams and pressurized gases are provided to the nozzle device 20 via the common passage 25 firstly. Concretely, the common passage 25 has a rectangular cross section, which has a first diameter (not labeled) larger than the diameter of the solder ball 30. Due to the solder balls 30, pressurized gases and laser beams are provided via the same passage, therefore the loss of the laser energy can be reduced effectively, and the pressure of the nozzle device 20 can be kept stable.

As shown in FIG. 4, the nozzle device 20 includes a nozzle 201 and a holder 202 for holding the nozzle 201. The nozzle 201 and the holder 202 are two separate and removable structures and connected by a fixture, such as a screw 203. Concretely, then nozzle 201 provides a main passage 204 which has a tapered cross section. And the main passages 204 include a wider portion (not labeled) and a narrow portion (not labeled). A solder ball outlet 205 is formed on the tip of the narrow portion, which has a second diameter (not labeled) smaller than the diameter of the solder ball. The type and size of the nozzle 201 and the solder ball outlet 205 are not limited, it's determined by the size of the pre-welding surfaces. Since the nozzle 201 and the holder 202 are separate and removable, thus it's convenient to clean or change the nozzle 201, which can reduce the maintaining time and maintaining workload and, in turn, improve the efficiency.

The holder 220 has two housing sections 221, 222 and a guiding passage 223 formed therebetween. Concretely, the guiding passage 223 is communicated with the main passage 204 of the nozzle 201 and the common passage 25, and preferably, the three passages 223, 204, 25 are coaxial. In this embodiment, the guiding passage 223 has a tapered cross section which also has a wider portion (not labeled) and a narrow portion (not labeled), and the wider portion has a maximum diameter D3, and the narrow portion has a minimum diameter D4 which is larger that the first diameter.

The solder ball feeding device 21 of the present invention includes a conveyor 211 for storing multiple solder balls and delivering a single solder ball at one time and actuated by a motor 212 which is controlled by a control unit 241 of the control device 24. Concretely, one exit of the common passage 25 is connected with the conveyor 211.

As one embodiment of the present invention, the control device 24 includes a first sensor 242 connected with the common passage 25 and adapted for detecting whether a single solder ball is provided on the common passage 25. And then the first sensor 242 will send a signal to the control unit 241, and the control unit 241 will respond accordingly.

Concretely, the laser device 23 includes a laser generator 231 connected with the control unit 241 and the common passage 25, and reflection glass 232 connected with the common passage 25. Concretely, a through hole 233 is formed on the reflection glass 232, and the through hole 233 is communicated with the common passage 25. Thus through the through hole 233, the laser beams are gathered and guided into the nozzle device 20. Furthermore, the optical axis of the laser device 23 is easy to adjust to ensure the laser beams focus on the solder ball 30, thus the laser energy can be used efficiently with less loss.

As described above, the gas pump device 22 is connected with the common passage 25 for supplying pressurized gases into the nozzle device 20. As a preferable embodiment, the pressurized gases include protective gases and inert gases. The inert gases such as nitrogen are used for controlling the falling speed of the solder ball and activating the liquid solder ball fall to the pre-welding surfaces, and the supply of the protective gases is kept during the whole soldering process so as to prevent the solder ball from being oxidated by the air.

Preferably, a second sensor 243 is connected with the guiding passage 223, concretely is formed on the housing section 221 of the holder 220. The second sensor 243 connected with the control unit 241 will detect the pressure within guiding passage 223 and the main passage 204 in real time, if the pressure detected achieves to a predetermined value, a corresponding signal will be sent to the control unit 241 so as to control the motor 212 of the solder ball feeding device 21 or the laser device 23.

More preferably, a third sensor 244 is configured on the nozzle 201 or the holder 202 for detecting the distance between the solder ball outlet 205 and the pre-welding surfaces. If the distance achieves to a predetermined value, the nozzle device 20 will stay at the position. Accordingly, a corresponding signal will be sent to the control unit 241 so as to control the motor 212 of the solder ball feeding device 21 or the laser device 23.

Now please combine with FIGS. 3-4, the fundamental principle of the present invention will be described.

Firstly, position the nozzle 201 above the pre-welding surfaces 250 at an appropriate position, a signal will be sensed by the third sensor 244 and sent to the control unit 241 so that the motor 212 of the solder ball feeding device 21 may command the conveyor 211 to free a single solder ball 30 to the common passage 25. And then the first sensor 242 will detect that the common passage 25 is occupied by the solder ball 30, and send a signal to the control unit 241 to command the gas pump device 22 to supply the inert gases. Thus the inert gases will be supplied to the common passage 25, the guiding passage 223 and the main passage 204 in turns. Concomitantly, the solder ball 30 falls down stage by stage. The laser device 23 will be activated by the control unit 241 and emit laser beams to the solder ball 30 when the pressure in the nozzle device 20 achieves a predetermined value. Therefore, the solder ball 30 will be melted and jets out from the solder ball outlet 205 of the nozzle 201 under the pressure of the inert gases, and finally contact the pre-wedding surfaces 250 to achieve the solder connection. At the same time, the second sensor 243 will detect the pressure in real time and feed it back to the control unit 241 to start a new solder connection or stop the process.

The apparatus 2 of the present invention can apply to any connection needed to connect in the disk drive unit, for example, an electrical solder connection between a slider and a suspension of a HGA, an electrical solder connection between a grounding pin or a voice lead provided on a fantail spacer and an FPC, an electrical solder connection between a suspension flexure of a HGA and a FPC, or an electrical solder connection between an PCBA and an FPC, and the like.

Furthermore, the apparatus 2 also can be used for repairing the defective solder connections. When used for repairing, firstly, the nozzle 201 is faced to the solder ball on the soldered surfaces with a predetermined distance, and the control device 24 commands the laser device 23 to emit laser beams, so as to melting the solder ball, and immediately the gas pump device 22 pumps out the gas and air in the nozzle device 20 thereby sucking the melted and liquid solder ball from the soldered surfaces and into the nozzle device 20. After sealing off the solder ball, a new solder ball will be supplied and a new soldering connecting can be performed according to the explanation above.

Figure 5:
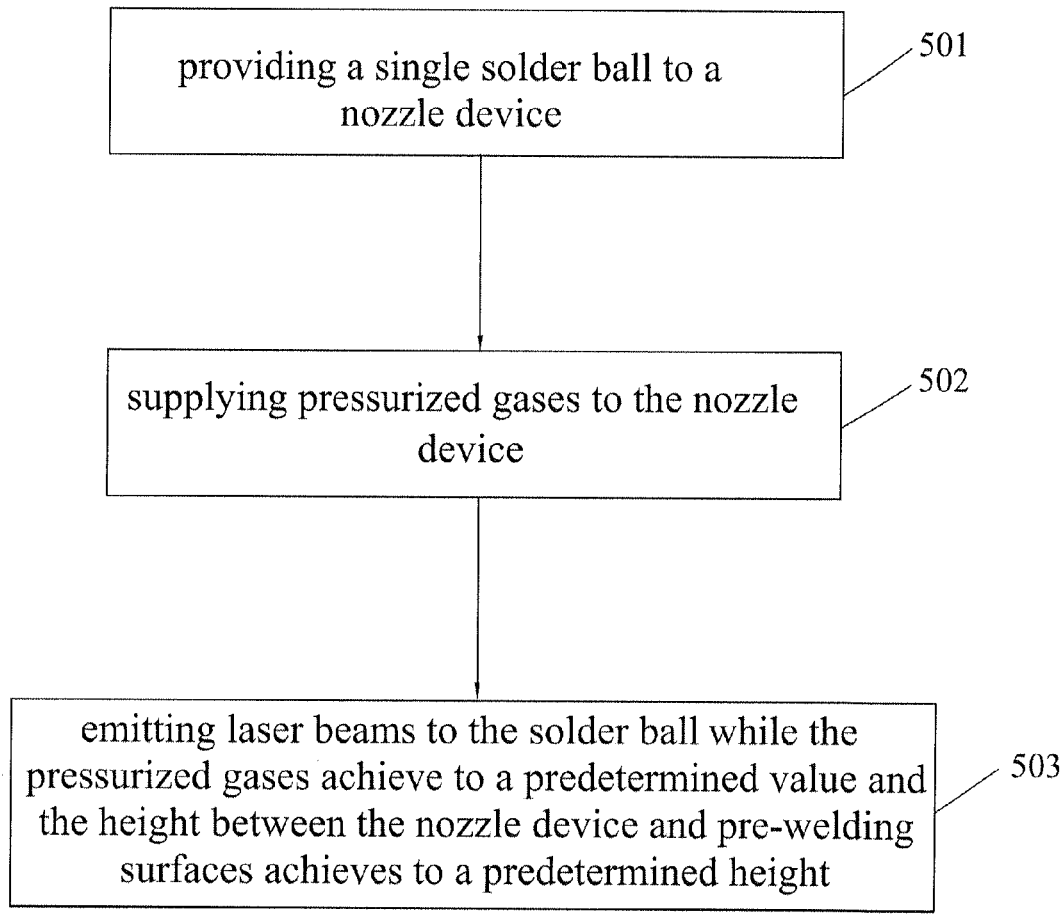
FIG. 5 is a flowchart of method for forming electrical solder connection in a disk drive unit according to one embodiment of the present invention.

Accordingly, as shown in FIG. 5, a method for forming electrical solder connection in a disk drive unit of the present invention includes:

Step (501), providing a single solder ball to a nozzle device;

Step (502), supplying pressurized gases to the nozzle device; and

Step (503), emitting laser beams to the solder ball 30 while the pressurized gases achieve to a predetermined value and the distance between the nozzle device and pre-welding surfaces achieves to a predetermined distance.

As a preferred embodiment, the pressurized gases and the laser beams are provided to the nozzle device via a common passage.

Preferably, the pressurized gases include protective gases and inert gases.

Preferably, the method of the present invention further includes supplying protective gases during the soldering process thereby preventing the solder ball from being oxidated.

The method includes all corresponding technical features with that of the apparatus 2 explained above, and can obtain the same advantages, thus the same descriptions are omitted here.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An apparatus for forming electrical solder connections in a disk drive unit, comprising:
a nozzle device for carrying out soldering on two pre-welding surfaces, the nozzle device comprising a nozzle and a holder for holding the nozzle, and the nozzle and the holder being two separate structures removably connected to one another by a fixture; the nozzle having a main passage and a solder ball outlet, and the holder having a guiding passage communicated with the main passage and a common passage, and the common passage, guiding passage and main passage being coaxial;

a solder ball feeding device for transferring a single solder ball to the nozzle device;

a gas pump device for supplying pressurized gases to the nozzle device;

a laser device for emitting laser beams to the solder ball, thereby melting and reflowing the solder ball; and a control device comprising at least one sensor for at least detecting status of the solder ball or pressure in the nozzle device or distance between the nozzle device and the pre-welding surfaces, and a control unit connected with the at least one sensor, the control device further comprising a second sensor connected with the guiding passage and being configured to detect whether the pressure in the guiding passage achieves a predetermined value, wherein the common passage is provided for connecting the nozzle device with the solder ball feeding device, the gas pump device and the laser device respectively, the common passage has a rectangular cross section, which has a first diameter larger than the diameter of the solder ball, and the guiding passage has a tapered cross section which has a maximum diameter and a minimum diameter, and the minimum diameter is larger than the first diameter.

2. The apparatus according to claim 1, wherein the control device comprises a first sensor connected with the common passage for detecting whether a single solder ball is provided on the common passage.

3. The apparatus according to claim 1, wherein the control device comprises a third sensor configured on the nozzle or the holder for detecting the distance between the solder ball outlet and the pre-welding surfaces.

4. The apparatus according to claim 1, wherein the laser device comprises a laser generator connected with the control device and reflection glass connected with the common passage and the guiding passage via a through hole formed on the reflection glass.

5. An apparatus for forming electrical solder connections in a disk drive unit, comprising:

a nozzle device for carrying out soldering on two pre-welding surfaces, the nozzle device comprising a nozzle and a holder for holding the nozzle, and the nozzle and the holder being two separate structures removably connected to one another by a fixture; the nozzle having a main passage and a solder ball outlet, and the holder having a guiding passage communicated with the main passage and a common passage, and the common passage, guiding passage and main passage being coaxial;

a solder ball feeding device for transferring a single solder ball to the nozzle device;

a gas pump device for supplying pressurized gases to the nozzle device;

a laser device for emitting laser beams to the solder ball, thereby melting and reflowing the solder ball; and a control device comprising at least one sensor for at least detecting status of the solder ball or pressure in the nozzle device or distance between the nozzle device and the pre-welding surfaces, and a control unit connected with the at least one sensor, the control device further comprising a second sensor connected with the guiding passage and being configured to detect whether the pressure in the guiding passage achieves a predetermined value, wherein the common passage is provided for connecting the nozzle device with the solder ball feeding device, the gas pump device and the laser device respectively, the common passage has a rectangular cross section, which has a first diameter larger than the diameter of the solder ball, and wherein the main passage has a tapered cross section, and the solder ball outlet narrows and has a second diameter which is smaller than the diameter of the solder ball.

6. The apparatus according to claim 1, wherein the pressurized gases comprises protective gases and inert gases.

* * * * *